US012403922B2

(12) United States Patent
Atoui et al.

(10) Patent No.: US 12,403,922 B2
(45) Date of Patent: Sep. 2, 2025

(54) METHOD FOR ASSISTING WITH DRIVING AN AUTONOMOUS MOTOR VEHICLE ON A ROAD (71) Applicant: RENAULT S.A.S, Boulogne Billancourt (FR)

(72) Inventors: Hussam Atoui, Guyancourt (FR); David Gonzalez Bautista, Saint Cyr l'ecole (FR); Imane Mahtout, Guyancourt (FR); Vicente Milanes, Valladolid (ES)

(73) Assignee: AMPERE S.A.S., Boulogne Billancourt (FR)

( * ) Notice: Subject to any disclaimer, the term of this patent is extended or adjusted under 35 U.S.C. 154(b) by 118 days.

(21) Appl. No.: 18/258,087

(22) PCT Filed: Dec. 7, 2021

(86) PCT No.: PCT/EP2021/084647
§ 371 (c)(1),
(2) Date: Jun. 16, 2023

(87) PCT Pub. No.: WO2022/128643
PCT Pub. Date: Jun. 23, 2022

(65) Prior Publication Data
US 2024/0034340 A1 Feb. 1, 2024

(30) Foreign Application Priority Data
Dec. 17, 2020 (FR) .................................... 20 13417

(51) Int. Cl.
B60W 50/06 (2006.01)
B60W 50/00 (2006.01)
B60W 60/00 (2020.01)

(52) U.S. Cl.
CPC .......... *B60W 50/06* (2013.01); *B60W 60/001* (2020.02); *B60W 2050/0014* (2013.01);
(Continued)

(58) Field of Classification Search
CPC ............... B60W 50/06; B60W 60/001; B60W 2050/0014; B60W 2530/10;
(Continued)

(56) References Cited

U.S. PATENT DOCUMENTS 6,208,981 B1 * 3/2001 Graf ..................... B60G 17/018
706/2
2012/0271517 A1 * 10/2012 Norris ................... G05D 1/0278
701/44

(Continued)

OTHER PUBLICATIONS

International Search Report issued Mar. 31, 2022 in PCT/EP2021/084647 filed on Dec. 7, 2021, 2 pages.

(Continued)

Primary Examiner — Jelani A Smith
Assistant Examiner — Alyssa Rorie
(74) Attorney, Agent, or Firm — Oblon, McClelland, Maier & Neustadt, L.L.P.

(57) ABSTRACT

A method for assisting with driving a motor vehicle includes generating a control response to be made with respect to a current situation and sending a command to an actuator in order to control the vehicle. In accordance with an item of quality information regarding the result of the command, the method further includes generating, by reinforcement learning, a new control response, the new control response being optimized with respect to the current situation.

12 Claims, 6 Drawing Sheets (52) U.S. Cl.
CPC ..... *B60W 2530/10* (2013.01); *B60W 2530/20* (2013.01); *B60W 2552/05* (2020.02); *B60W 2555/20* (2020.02)

(58) Field of Classification Search
CPC ......... B60W 2530/20; B60W 2552/05; B60W 2555/20; B60W 2530/00; B60W 2552/00; B60W 2554/406; B60W 50/0098; B60W 2050/0088
See application file for complete search history.

(56) References Cited

U.S. PATENT DOCUMENTS

| | | | |
|---|---|---|---|
| 2017/0249844 A1* | 8/2017 | Perkins | G06V 20/59 |
| 2018/0348763 A1* | 12/2018 | Jiang | G06N 3/08 |
| 2019/0113920 A1* | 4/2019 | Englard | G05D 1/0274 |
| 2020/0218271 A1 | 7/2020 | Krystek et al. | |
| 2020/0249674 A1* | 8/2020 | Dally | G05D 1/0221 |
| 2020/0276988 A1 | 9/2020 | Graves | |
| 2021/0341886 A1* | 11/2021 | Liu | G06N 3/006 |
| 2022/0317695 A1* | 10/2022 | Wang | G06N 3/0442 |

OTHER PUBLICATIONS

French Preliminary Search Report issued Aug. 10, 2021 in French Patent Application No. 20 13417 filed Dec. 17, 2020, 3 pages (with Translation of Category of Cited Documents).

\* cited by examiner

METHOD FOR ASSISTING WITH DRIVING AN AUTONOMOUS MOTOR VEHICLE ON A ROAD

TECHNICAL FIELD

The present invention relates to a method for assisting in the driving of an autonomous motor vehicle on a road, a driving assistance device for controlling said autonomous motor vehicle, a computer program product comprising program instructions that can be used by said driving assistance device and an autonomous motor vehicle comprising said driving assistance device.

PRIOR ART

In recent years, the advances made in motor vehicle equipment in terms of driver assistance systems have contributed to a significant improvement in road safety. The challenge of the future is to how to design autonomous motor vehicles. An autonomous motor vehicle is a motor vehicle adapted to travel on an open road without or with little intervention from a driver. The concept aims to develop and to produce such a vehicle that can ultimately travel in total safety on a public highway and can do so regardless of the traffic generated by other vehicles or obstacles (human, animal, tree, etc.) present on the highway. The notion of an autonomous motor vehicle here covers a totally autonomous motor vehicle in which the intervention of a human operator is not necessary for the driving of said vehicle. This notion also covers a so-called "semi-autonomous" motor vehicle that has automated driving assistance systems but in which the intervention of the human operator remains significant overall.

The operation of an autonomous motor vehicle is generally governed jointly by an embedded navigation device and by a predetermined path definition device. The embedded navigation device is designed to program an itinerary on the large scale, that is to say on the scale of a road network. This itinerary comprises a series of consecutive road segments suitable for linking an origin position to a destination. This series of road segments can possibly vary dynamically according to the traffic conditions detected or predefined constraints on movement in the road network (closure of certain sections for works in progress, for example).

The reference path definition device is, for its part, designed to automatically process the paths of movement of vehicles on the local scale, of the order of a few tens or hundreds of meters. This reference path definition device is adapted to implement the itinerary programmed by the navigation system. This implementation is realized by determining the position, the direction and the speed of the vehicle over time according to movement constraints, such as dynamic constraints of the motor vehicle (maximum speed, longitudinal acceleration, steering lock angle, etc.), environmental constraints (obstacles on the road, etc.) or optimization constraints (minimization of the lateral acceleration of the motor vehicle, for example).

In an autonomous driving context, a motor vehicle is arranged to follow a predefined urban or extra-urban itinerary by travelling a series of sections of road determined by the embedded navigation device. The reference path is defined by a set of cartesian coordinates that are variable in time and calculated in real time according to the road section that the predefined itinerary has reached and environmental parameters. The implementation of this computation can be done using a road markings recognition device, radar or laser detection means, an obstacle recognition device, etc. While running, the motor vehicle follows a real path which can be different from the reference path. Indeed, while running, the motor vehicle undergoes a certain number of constraints (pressure of the wheels, road level differences, wind force, etc.) which cannot be incorporated by the predetermined path definition device. Consequently, there may be an offset between this real path and the reference path that should be minimized.

The document US2018/0348763 discloses a driving assistance method designed to optimize the control of an autonomous motor vehicle. This method comprises a step of reception of a plurality of data on perception of a driving environment around the vehicle and a step of generation of a command for the control of said vehicle. This command can be generated according to a deliberation mode or according to an intuitive mode. In the deliberation mode, the command is generated on the basis of a predefined set of driving rules. In the intuitive mode, the command is generated on the basis of a machine learning model. The choice of the decision-making mode, deliberation mode or intuitive mode is made on the basis of the data collected. In a complex situation, the method is adapted to use the deliberation mode. In a more familiar situation, the method is adapted to use the intuitive mode. The driving assistance method is then repeated by switching from one decision-making mode to the other. Although this system makes it possible to obtain an adaptive driving assistance method, two decision-making devices must be maintained and updated in parallel, i.e. one device based on rules and one device based on machine learning. These two devices must be perfectly synchronized because the method can invoke one or other according to the selected mode of operation. This can lead to delays in the process which can be critical for certain maneuvers. Furthermore, the machine learning disclosed in this document requires complete learning each time there is the processing of new data which can provide different performance levels from one cycle to another.

There is therefore a need to propose a driving assistance method that is more reactive while being more precise in the response of the command to be made.

SUMMARY OF THE INVENTION

The present invention aims to at least partly remedy this need.

More particularly, the present invention aims to improve the control of an autonomous vehicle on a road.

A first subject of the invention relates to a method for assisting in the driving of an autonomous motor vehicle on a road. This driving assistance method comprises a step of reception of a plurality of data and a step of processing of the plurality of the received data to determine a current situation of the autonomous motor vehicle. In addition, the method comprises a step of generation of a control response to be made with respect to said current situation and a step of sending of a command to control the autonomous motor vehicle, said command being dependent on said response to be made. Based on an item of quality information on the result of the command to control the autonomous motor vehicle, the method comprises a step of generation, by reinforcement learning, of a new control response, said new control response being optimized with respect to the current situation.

The invention proposes a multiple-evolution decision-making system capable of generating the most suitable response by combining in real time all the available information with the knowledge acquired in similar situations in the past. This device offers two main functionalities to satisfy these demands. In a first functionality, the method makes it possible to take account of the approximate data of three main parameters affecting the performance levels of the autonomous motor vehicle, namely the state of the vehicle, the state of the road and the interaction with the environment. In a second functionality, the method makes it possible to adapt the decision to a current situation by comparing this current situation with other preceding situations with which the vehicle has been confronted. This learning makes it possible to accordingly adapt the control of the vehicle.

In a particular embodiment, the plurality of the received data comprises a first type of data, a second type of data and a third type of data, the data of the first type of data regarding an evolution of the vehicle, the data of the second type of data regarding an evolution of the road, the data of the third type of data regarding an evolution of the environment.

In a particular embodiment, the data of the first type of data comprise data selected from among the list of the following data:
- data on change of weight;
- data on change of tire;
- data on change of the status of the autonomous motor vehicle.

In a particular embodiment, the data of the second type of data comprise data selected from among the list of the following data:
- data on weather conditions;
- data on the type of road;
- data on the state of the road.

In a particular embodiment, the data of the third type of data comprise data selected from among the list of the following data:
- free driving data;
- nominal driving data;
- emergency driving data.

In a particular embodiment, the steps of reception and processing of the plurality of data, the step of generation of a control response and the step of sending of the command are performed according to a fuzzy logic.

The invention proposes a system based on the fuzzy logic which is slightly updated/modified according to the results of the actions of the vehicle. It is not thus necessary to perform complete learning each time. This type of complete learning can indeed provide performance levels that are completely different from one test to another.

Another subject of the invention relates to a device for assisting in the driving of an autonomous motor vehicle.

Another subject of the invention relates to a device for assisting in the driving of an autonomous motor vehicle on a road. The device comprises:
- a fuzzy system comprising:
  - a fuzzying module adapted to receive and process a plurality of data in order to determine a current situation of the autonomous motor vehicle;
  - an inference engine adapted to interrogate a database in order to obtain a control response to be made with respect to said current situation;
  - a defuzzying module adapted to command an actuator according to the response to be made, in order to control the autonomous motor vehicle.

The device also comprises a reinforcement learning agent, said agent being adapted to generate a new optimized response with respect to the current situation based on an item of quality information on the result of the command for the control of said autonomous motor vehicle.

Thus, by virtue of this decision-making device, the autonomous driving will have the possibility of imitating the reactions of the human driver in complex scenarios by creating a learning base to optimize the response to be made in real time.

Another subject of the invention relates to a computer program product comprising program instructions that can be used by the driving assistance device according to a preceding subject, which, when they are executed or interpreted by said driving assistance device, trigger the implementation of the driving assistance method according to another preceding subject in an autonomous motor vehicle.

Another subject of the invention relates to an autonomous vehicle comprising a driving assistance device according to one of the preceding subjects.

The present invention will be better understood on reading the detailed description of embodiments taken as non-limiting examples and illustrated by the attached drawings in which.

The invention is not limited to the embodiments and variants presented and other embodiments and variants will become clearly apparent to the person skilled in the art.

In the different figures, the elements that are identical or similar bear the same references.

Figure 1:
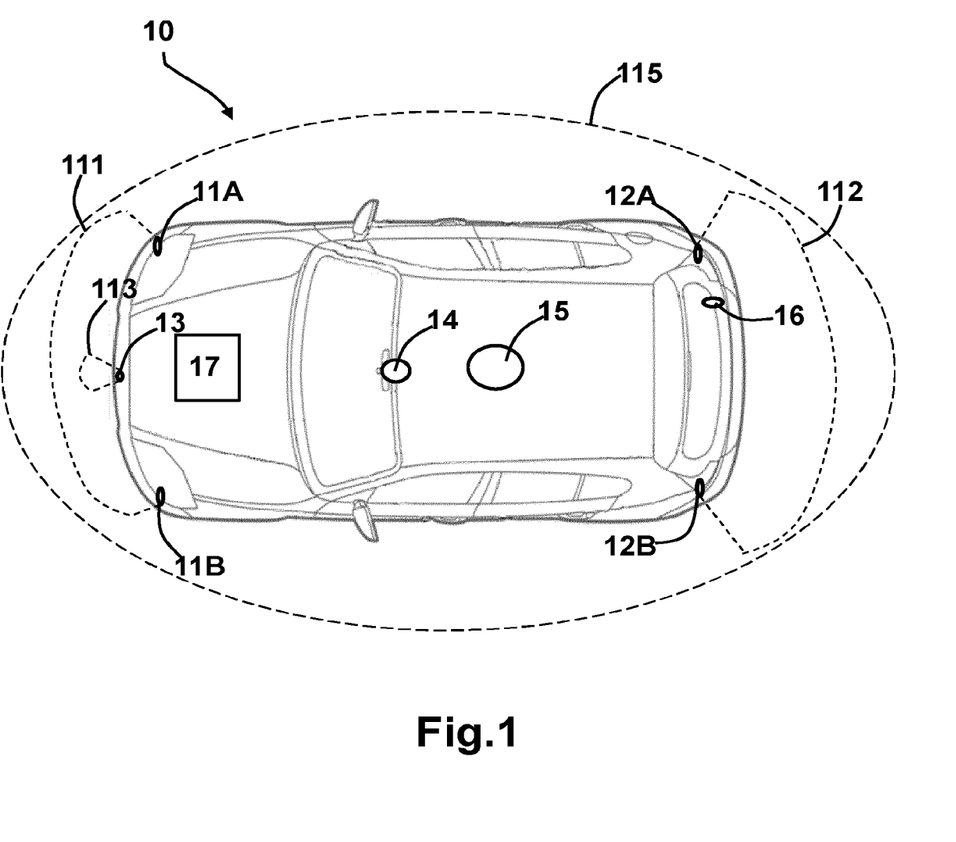
FIG. 1 is a schematic view illustrating an autonomous motor vehicle according to the invention.

FIG. 1 schematically represents a top view of a motor vehicle 10 according to the present invention. This motor vehicle 10 comprises a front vehicle part, a rear vehicle part, a vehicle roof, a vehicle interior, steering means (not represented). The motor vehicle also comprises a chassis and one or more bodywork panels mounted or fixed on said chassis.

The motor vehicle 10 is, here, an autonomous vehicle. An autonomous vehicle is understood to be a motor vehicle that is totally autonomous or semi-autonomous. There are indeed several levels of autonomy in a motor vehicle.

In a first level, called level 1, the motor vehicle is responsible for a limited number of driving operations associated with said motor vehicle. The driver then remains responsible for most of the driving control operations. In level 1, the operations to control acceleration and/or braking (speed regulator, etc.) are controlled by the motor vehicle. This level 1 corresponds to a driving assistance level.

In a second level, called level 2, the motor vehicle is adapted to collect information (for example via one or more driving assistance systems, sensors, etc.) on the outside environment (the road around the motor vehicle, the roadway, the road traffic, the ambient conditions). In this level 2, the autonomous vehicle is adapted to use the collected information in order to control certain driving operations (for example, the steering, the acceleration and/or the braking). This level 2 is level of partial automation of the motor vehicle. It should be noted that, for level 1 and for level 2, the driver must maintain full monitoring of the driving operations performed by the autonomous motor vehicle.

In a third level, called level 3, the driver delegates all the driving operations to the motor vehicle except when said motor vehicle prompts the driver to act or intervene to control one or more of these driving operations. This level 3 is a conditional automation level.

In a fourth level, called level 4, the driver no longer manages any driving operation. It is the motor vehicle which then controls all of the driving operations, including when the driver does not respond to an intervention request. Level 4 is a high automation level.

In a fifth level, called level 5, the motor vehicle controls all the driving operations. The motor vehicle thus monitors, while running, the road traffic, the actors that are mobile on the road (human beings, animals), the obstacles that are immobile on the road, and the road itself. At this level 5, no interaction with a human driver is required. The level 5 is the complete automation level. It should be noted that, for levels 3 to 5, the motor vehicle is adapted to monitor the driving operations and to monitor the environment outside of said motor vehicle.

To be able to perform the various driving operations in these different levels of autonomy, the motor vehicle 10 comprises a certain number of sensors such as:
  a front radar 11A, 11B;
  a rear radar 12A, 12B;
  an ultrasound sensor 13;
  a video camera 14;
  a LIDAR 15;
  a GPS antenna 16.

The front radar comprises two front radar elements 11A, 11B disposed on the front vehicle part on either side of an axis of symmetry of said motor vehicle 10. The front radar has a detection zone 111 in front of the motor vehicle. It is thus adapted to detect the positions of the surrounding objects. It makes it possible to measure the speed of the motor vehicle. The information collected by the front radar 11A, 11B is particularly useful for implementing certain driving operations such as emergency braking or central strip crossing prevention.

The rear radar comprises two rear radar elements 12A, 12B disposed on the rear vehicle part on either side of the axis of symmetry of said motor vehicle 10. The rear radar has a detection zone 112 to the rear of the motor vehicle. It is thus suitable for detecting the positions of the surrounding objects. It makes it possible to measure the speed of the other motor vehicles following said motor vehicle 10. The information collected by the rear radar 12A, 12B is particularly useful for implementing certain driving operations such as emergency braking or central strip crossing prevention.

The ultrasound sensor 13 is disposed on the front part of the vehicle between the two front radar elements 11A, 11B. The ultrasound sensor 13 has a detection zone 113 that is much smaller than the detection zone 111 of the front radar 11A, 11B. This ultrasound sensor 13 is thus adapted to detect very close obstacles. The collected information is particularly useful for implementing driving operations such as maintaining a safe distance with another motor vehicle directly in front of said motor vehicle 10.

The video camera 14 is situated here behind the rear view mirror. The information collected by this video camera 14 is particularly useful for the implementation of certain driving operations such as decrypting signaling panels, identifying borders and central strips, detecting actors moving on the road (human beings, animals).

The LIDAR ("Light Detection And Ranging") 15 is a sensor situated here on the roof of the motor vehicle 10. It makes it possible to perform measurements by light detection and ranging. Light detection and ranging is a distance measurement technique based on the analysis of the properties of a light beam returned to its emitter. The LIDAR has a detection zone 115 that is fairly wide, for example of the order of 50 meters in diameter. It makes it possible to permanently scan the environment to 360° to make a 3D mapping thereof. The information collected by the LIDAR 15 is useful for the implementation of certain driving operations such as obstacle detection, including at night.

The GPS antenna 16 is situated on the rear part of the motor vehicle 10. It makes it possible to receive GPS ("Global Positioning System") signals. The navigation data can then be updated in the motor vehicle 10 from these GPS signals.

The motor vehicle also comprises a central computer 17 adapted to process the various data from the sensors 11A, 11B, 12A, 12B, 13, 14, 15, 16. The central computer 17 and the sensors 11A, 11B, 12A, 12B, 13, 14, 15, 16 are linked in the motor vehicle by one or more networks (not represented) of CAN ("Controller Area Network") bus type for transporting said data from the sensors.

Figure 2:
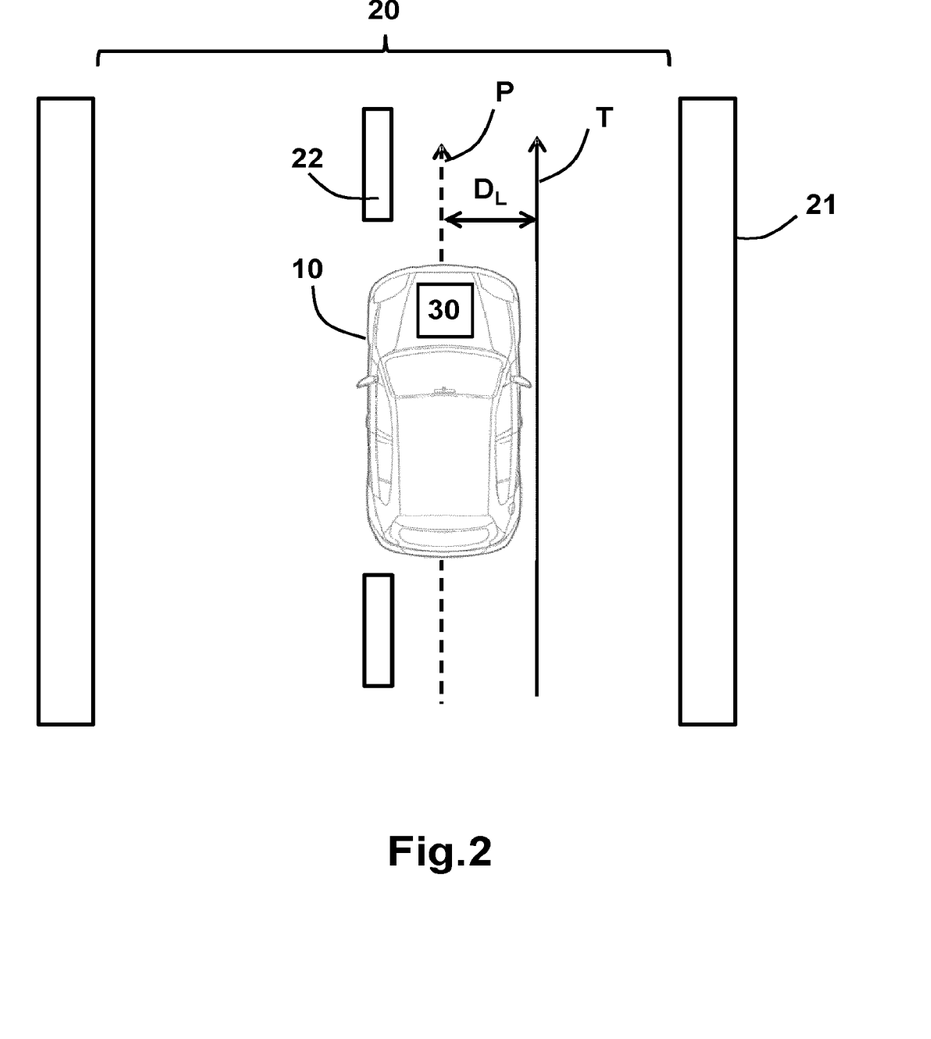
FIG. 2 illustrates the autonomous motor vehicle of FIG. 1 in operation on a road.

FIG. 2 illustrates the autonomous motor vehicle of FIG. 1 on a road 20. In order to simplify this illustration, the sensors 11A, 11B, 12A, 12B, 13, 14, 15 have not been represented in FIG. 2. The road 20 is delimited by two borders 21. It is also divided into two separate lanes by a plurality of central strips 22. In FIG. 2, the vehicle runs on the righthand lane following a real path P. This real path P is, here, offset laterally by a distance DL with respect to a reference path T. The reference path T has been previously calculated by the navigation system of the motor vehicle 10, notably based on the data from the GPS signals received by the GPS antenna 16. This reference path T here extends at mid-distance between the border 21 and the central strips 22. The aim of the invention is to assist the vehicle 10 in how to best follow the reference path T. For that, the motor vehicle 10 comprises a driving assistance device 30 illustrated in FIG. 3. This driving assistance device 30 is, in a preferential embodiment, incorporated directly in the central computer 17 of the motor vehicle of FIG. 1.

Figure 3:
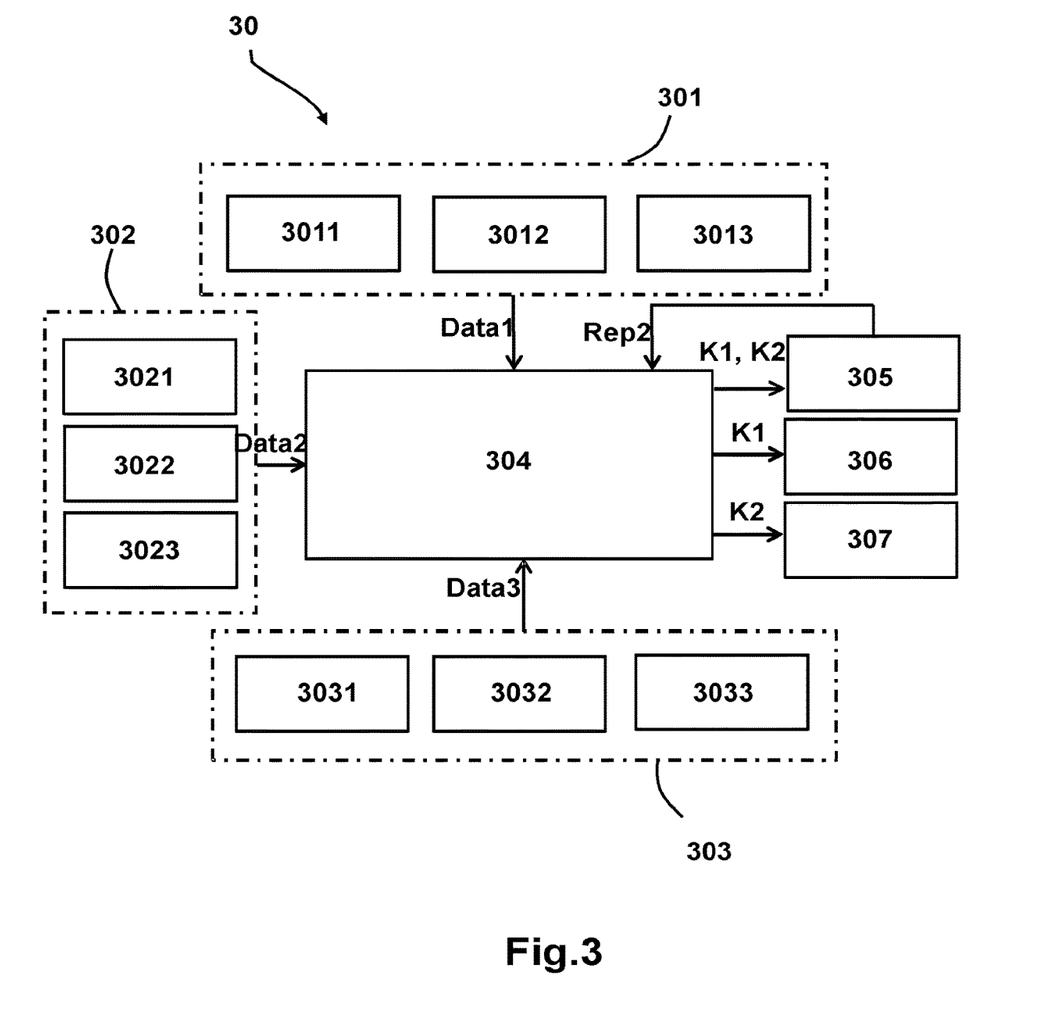
FIG. 3 is a diagram illustrating a device for assisting in the driving of the motor vehicle of FIG. 1 on the road of FIG. 2.

FIG. 3 illustrates in more detail the driving assistance device 30. As has already been specified, this driving assistance device 30 is adapted to control the movements of the autonomous motor vehicle 10. It comprises:
  a vehicle evolution module 301;
  a road evolution module 302;
  an environment evolution module 303;
  a fuzzy system 304;
  a reinforcement learning agent 305;
  an actuator control block 306;
  a human-machine interface 307.

The vehicle evolution module 301 is adapted to provide a first type of data data1. This first type of data data1 provides information on any potential situation likely to modify the dynamics of the vehicle 10. The evolution module 301 comprises:
  a weight change block 3011;
  a tire change block 3012;
  a vehicle state change block 3013;

The weight change block 3011 is adapted to supply weight change data. These data relate to the weight of the autonomous motor vehicle 10 and how it is distributed in said vehicle (passengers, goods, etc.). The weight change data are important because the characteristics associated with the weight of the vehicle can completely modify the dynamics of the vehicle and influence the most appropriate decision to be taken according to the situation. The block 3011 is thus responsible for analyzing any skew with respect to nominal values.

The tire change block 3012 is adapted to provide tire change data. The tires constitute points of contact between the vehicle 10 and the road 20. The associated data are therefore important because they make it possible to obtain a good estimation of the relationship between the lateral forces and the slip angle, that is to say the turn stiffness. This stiffness can be assessed by using an observer to measure the deviation between nominal values/factory values and values updated in real time.

The vehicle state change block 3013 is adapted to supply data on any unexpected change in the motor vehicle likely to modify the dynamics of this vehicle, such as a sensor failure, a puncture, etc.

The data of the first type of data data1 from the evolution module 301 are therefore a combination of data originating from these various blocks 3011, 3012, 3013.

The road evolution module 302 is adapted to supply a second type of data data2. This second type of data data2 provides information on any potential situation likely to modify the state of the road. The state of the road has a strong impact on the driving of the vehicle. The evolution module 302 thus monitors any potential change that might arise from the line of the roadway.

The evolution module 302 comprises:
a weather conditions block 3021;
a road type block 3022;
a road state block 3023.

The weather conditions block 3021 is adapted to manage the changing of the weather conditions, notably in case of snow, ice, dryness or rain. The block 3021 is thus capable of adapting the optimal response to the specific situation. This evolution can be measured by a temperature sensor installed on the vehicle 10 or by any other means.

The road type block 3022 is adapted to manage the changing of the type of road on which the vehicle 10 is running. Indeed, the grip changes considerably when the vehicle is running on concrete, on asphalt, on gravel, on blocks or any other surface, which modifies the dynamics of the vehicle. This evolution can be measured by a front-mounted camera to detect the driving surface, by a detailed digital map including this information or by any other means.

The road state block 3023 is adapted to detect any sudden and unexpected change of the surface of the road, such as a hole, a spot of oil or any other hazardous situation which could have an impact on the dynamics of the vehicle.

The data of the second type of data data2 from the evolution module 302 are therefore a combination of data originating from these various blocks 3021, 3022, 3023.

The environment evolution module 303 is adapted to supply a third type of data data3. This third type of data data3 provides information on interactions with third parties such as pedestrians, other motor vehicles (cars, motorbikes, trucks, etc.).

The environment evolution module 303 comprises:
a free driving block 3031;
a nominal driving block 3032;
an emergency driving block 3033.

The free driving block 3031 comprises all of the cases in which there is no interaction. This block thus supplies free driving data reprising all the driving scenarios on a motorway with little traffic or any other potential situation in which no third party is located within the electronic horizon of the vehicle, that is to say the field of view of the obstacle sensors.

The nominal driving block 3032 comprises all the potential scenarios and the manner in which they are managed. This block thus supplies nominal driving data reprising different behaviors according to the driving scenario, such as a roundabout, an intersection, a lane reduction, an interaction with traffic lights, an exit lane, etc. The block 3032 can include specific processing operations for each scenario based on cases of use or a general processing according to a concept of generalization in which all the vehicles are translated into a single lane and processed as such.

The emergency driving block 3033 is adapted to manage all the sudden and unexpected changes while driving. This block thus supplies emergency driving data regarding, for example, a stop following a police injunction, a fire truck, an unexpected pedestrian or any other sudden situation among the nominal driving situations in which the vehicle must modify its pre-established decision rules.

The data of the third type of data data3 from the environment evolution module 303 are therefore a combination of data originating from these different blocks 3031, 3032, 3033.

The data of the first type of data data1, the data of the second type of data data2, and the data of the third type of data data3 determine a current situation Sa of the autonomous motor vehicle 10.

The driving assistance device 30 also comprises the fuzzy system 304, the reinforcement learning agent 305, the actuator control block 306 and the human-machine interface 307. The fuzzy system 304 is adapted to deliver a first command K1 to the actuator control block 306 and a second command K2 to a human-machine interface 307. These commands K1 and K2 are generated from the current situation resulting from the data of the first type of data data1, from the data of the second type of data data2 and from the data of the third type of data data3. The fuzzy system 304 is, here, also adapted to transmit to the reinforcement learning agent 305 the first command K1 and the second command K2 resulting from the current situation. The fuzzy system 304 is adapted to receive from the reinforcement learning agent 305 a new control response Rep2. This new control response Rep2 is optimized with respect to the current situation Sa. The fuzzy system 304 will be described in more detail hereinbelow using FIG. 4.

The reinforcement learning agent 305 is adapted to receive the commands K1 and K2 generated by the fuzzy system 304. The reinforcement learning agent 305 is adapted to also receive an item of quality information (not represented) on the result of the first command K1 to control the autonomous motor vehicle. Based on this quality information, the reinforcement learning agent 305 delivers to the fuzzy system 304 the new control response Rep2. The operation of the reinforcement learning agent 305 will be described in more detail hereinbelow using FIG. 5.

The actuator control block 306 is adapted to receive the first command K1. Based on this command K1, an actuator is used to pilot the path of the autonomous motor vehicle 10. This actuator is, for example, a steering column of the autonomous motor vehicle.

The human-machine interface 307 is adapted to communicate with a human driver. It can thus comprise sound devices or light devices. These devices are activated, for example, in case of danger necessitating an abrupt change of the path of the autonomous motor vehicle 10.

Figure 4:
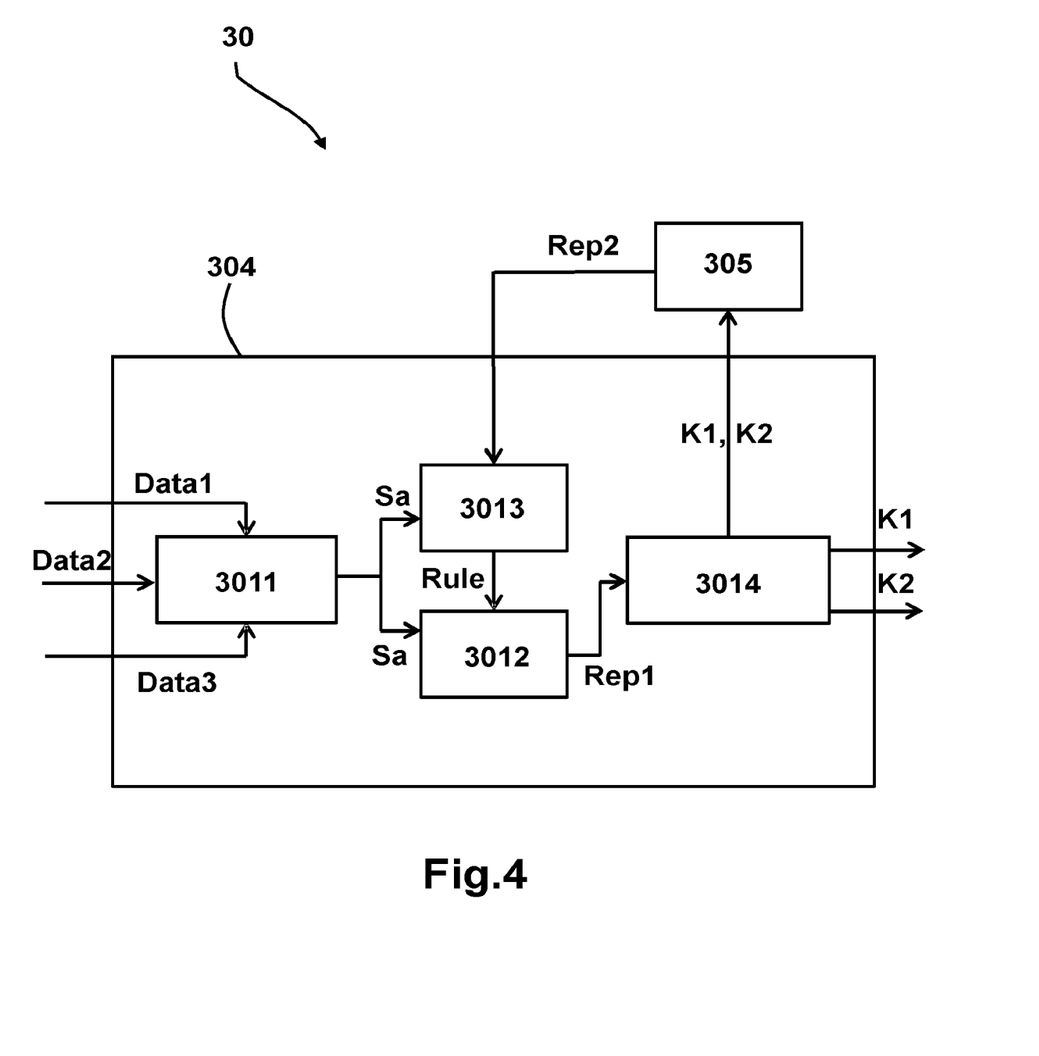
FIG. 4 is a diagram detailing a fuzzy system belonging to the driving assistance device of FIG. 3.

FIG. 4 illustrates in a more detailed way the fuzzy system 304 of the driving assistance device 30. This fuzzy system 304 comprises:
- a fuzzying block 3011;
- an inference engine 3012;
- a database 3013;
- a defuzzying block 3014.

The fuzzying block 3011 is adapted to receive and process a plurality of data of the various types of data data1, data2, data3 in order to determine the current situation Sa with which the autonomous motor vehicle 10 is confronted. In this block, the plurality of data of the different types of data data1, data2, data3 are translated into linguistic values representing the current situation Sa. This translation depends on functions of affiliation which represent the subjective knowledge of the human driver. The current situation Sa is then transmitted to the database 3013 and to the inference engine 3012.

The database 3013 is adapted to store inference rules. These inference rules have been formulated from human experience. Such an inference rule is, for example: if the weight of the vehicle is "heavy" and the tires are "worn", the risk is "high" and the decision is "conservative". The database 3013 is adapted to transmit to the inference engine 3012 the inference rule Rule suited to the current situation Sa. The database 3013 is, furthermore, adapted to receive the new control response Rep2 originating from the reinforcement learning agent 305. This new response Rep2 makes it possible to update the inference rules in order to optimize the response to be made in light of the current situation Sa, if it reoccurs in the future.

The inference engine 3012 is adapted to receive the inference rule Rule originating from the database 3013. The inference engine 3012 then applies this inference rule to the current situation Sa to generate an appropriate control response Rep1. For example, the inference engine 3012 can generate a control response Rep1 of the form: weight of the vehicle is heavy and the tires are worn, the risk is high and the decision is conservative.

The defuzzying block 3014 is adapted to receive the appropriate control response Rep1. From this control response Rep1, the defuzzying block 3014 transmits the first command K1 to the actuator control block 306 and the second command K2 to the human-machine interface 307. The first command K1 and the second command K2 are, here, also transmitted to the reinforcement learning agent 305. The defuzzying block 3014 implements the center-of-area method, called CoA method, to supply an average result from a conclusion of each rule given in the inference process. The first command K1 goes from fuzzy values to net values, thus giving a measure of the risk of the situation and of the strategy to be followed. The first command K1 includes a measurement value for the risk of the current maneuver and a decision value for the driving strategy to be followed. The two values are situated within the range of [0, 1] in which 0 means the lowest risk and the most efficient strategy and 1 means the highest risk and the need to adopt the most prudent strategy. A mathematical representation of the CoA method is as follows:

$$Output = \frac{\Sigma\, w_i O_i}{\Sigma\, w_i}$$

In which $w_i$ represents the weight assigned to each rule evaluation in the inference process and $O_i$ represents the values of singletons assigned to the output linguistic values. The result Output corresponds to the output of the defuzzying block 3014.

Figure 5:
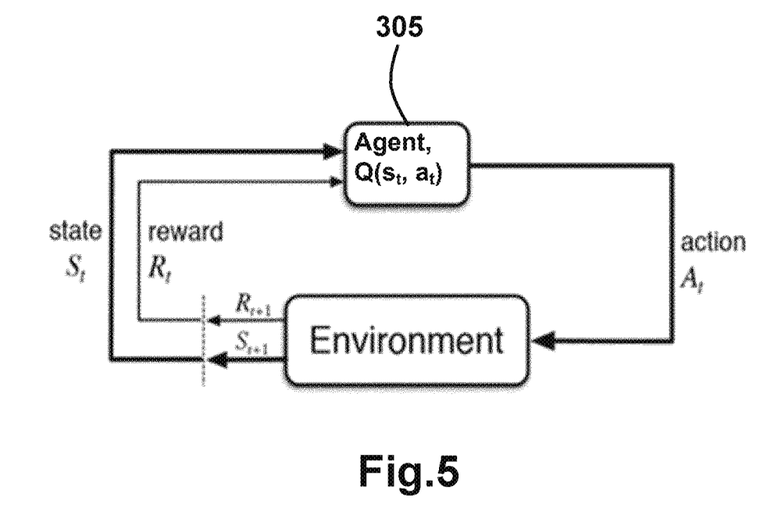
FIG. 5 is a diagram detailing the operation of a reinforcement learning agent belonging to the driving assistance device of FIG. 3.

FIG. 5 details the operation of the reinforcement learning agent 305.

On each cycle, the learning agent 305 receives information on the state of the environment (the data data1, data2, data3). From this information, the agent 305 selects a decision to be executed which modifies the state of the environment and results in a compensation. The problem that the learning agent 305 seeks to resolve is composed of the following elements: a set S of possible states of the environment, a set A of possible actions a and a set R of compensations r. However, it must be stressed that, despite the immediate compensation r, the true objective is to find a policy or an action tactic which maximizes a final compensation rf. Considering that the driving is a learning process, the application of this technique fits perfectly in the autonomous decision-making module of the vehicle. For the learning, the learning agent 305 uses Q-learning. Q-learning is a reinforcement learning method which is based on the calculation of a quality value Q associated with the actions that are available in a given state. This estimation of the quality is performed iteratively, that is to say by updating a value Q(s,a) on each cycle in which the action a is selected in this state. The updating is done through the following equation;

$$Q(s_t,a_t)=Q(s_t,a_t)+\alpha(r_t+\beta_{a_{t+1}}\max(Q(s_{t+1},a_{t+1}))-Q(s_t,a_t))$$

In which $s_t$ and $a_t$ are the state and the action undertaken at the moment t and $r_t$ is the compensation obtained for this action. The variable $\alpha$ is a parameter known as learning rate, which refers to the speed with which the algorithm adjusts its knowledge based on the experience. The value of this variable $\alpha$ lies between 0 and 1, this value being proportional to the desired speed. The variable $\beta$ is an updating factor of the algorithm which establishes the priority of the compensation in the long term with respect to the immediate compensation. The variable of this variable $\beta$ lies between 0 and 1, where 1 represents the highest priority of the compensation in the long term. Once the function Q converges to its final value, the optimal policy of the system can be obtained by selecting, in each state, the action having the maximum value of Q. This policy is reflected by the term $\max_{a_{t+1}}(Q(s_{t+1}, a_{t+1}))$.

The main advantage of this compensation-based approach is that it does not depend on the definition of an evolution model or of a control policy previously defined by the user, but that it is based directly on the interaction of the system with its environment and on the compensation received on each step. Furthermore, it corresponds perfectly to the objective of the learning block of this device since it intervenes only when it encounters a situation with which it has already been confronted, and not by using the learning for new situations which will be based on the multi-evolution decision block. That corresponds to the human behavior in which more aggressive maneuvers are performed for driving situations already encountered in the past, whereas a more conservative behavior is applied for new driving situations/scenarios.

The method for assisting in the driving of the motor vehicle of FIG. 1 is described hereinbelow in support of FIGS. 1 to 5 and FIG. 6.

Figure 6:
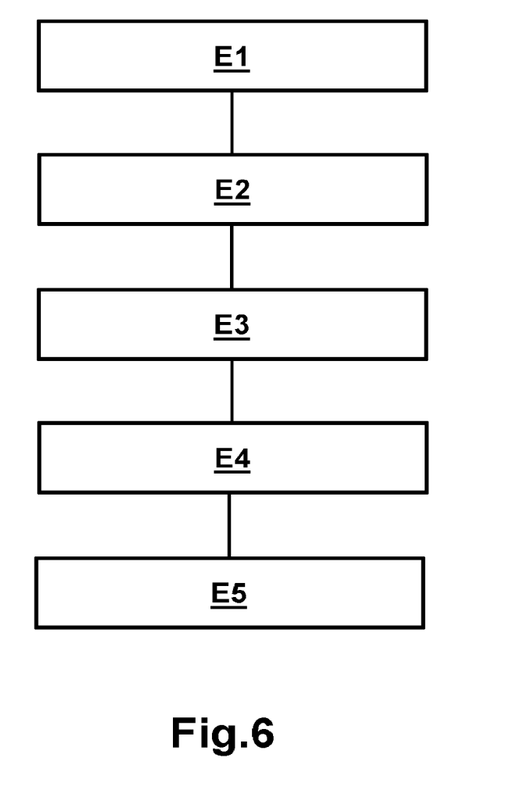
FIG. 6 is a diagram illustrating different steps of a method for assisting in the driving of the motor vehicle of FIG. 1, said control method being implemented by the driving assistance device of FIG. 3.

In FIG. 6, in a reception step E1, a plurality of data data1, data2, data3 are received by the fuzzying block 3011.

In a processing step E2, the received data data1, data2, data3 are processed by the fuzzying block 3011 to determine the current situation Sa of the autonomous motor vehicle 10.

In a step E3, a control response Rep1 is generated by the inference engine 3012 with respect to the current situation Sa.

In a step E4, a command K1 is sent by the defuzzying block 3014 to control the autonomous motor vehicle 10. This command K1 is dependent on the response to be made Rep1. During this step E4, the command K1 is also transmitted to the reinforcement learning agent 305.

In a reinforcement generation step E5, the new control response Rep2 is generated by the reinforcement learning agent 305. This new control response Rep2 is based on an item of quality information on the result of the command K1 to control the vehicle 10. This is optimized with respect to the current situation Sa. This new control response Rep 2 is transmitted to the database 3013 for an updating of the inference rules.

The steps of reception E1 and of processing E2 of the plurality of data data1, data2, data3, the step E3 of generation of a control response Rep1 and the step E4 of sending of the command K1 are performed according to a fuzzy logic.

The method for assisting in the driving of the motor vehicle 10 and the associated driving assistance system 30 thus make it possible to have:
- a smart decision-making system linked to an evolution module of the vehicle relative to any potential situation likely to modify the dynamics of the vehicle;
- a learning implemented by fuzzy logic and reinforcement learning.

The invention relates also to a computer program product comprising program instructions that can be used by the driving assistance device 30, which, when they are executed or interpreted by said driving assistance device 30, trigger the implementation of the driving assistance method.

The invention relates also to a motor vehicle 10 comprising the driving assistance device 30. This motor vehicle is a private passenger vehicle, as is represented in FIG. 1 and FIG. 2. As a variant, the motor vehicle is any other type of vehicle such as a bus or a truck The invention is not limited to the embodiments and variants presented and other embodiments and variants will become clearly apparent to the person skilled in the art.

The invention claimed is:

1. A method for assisting in driving of an autonomous motor vehicle on a road, said driving assistance method comprising:
    receiving a plurality of data;
    processing the plurality of the received data to determine a current situation of the autonomous motor vehicle;
    generating a control response to be made with respect to said current situation;
    sending a command to an actuator to control the autonomous motor vehicle, said command being dependent on said response to be made;
    sending the command to control the autonomous motor vehicle to a reinforcement learning agent:
    generating, based on an item of quality information on a result of the command to control the autonomous motor vehicle, by reinforcement learning, a new control response, said new control response being optimized with respect to the current situation,
    wherein the generating includes receiving the plurality of data, identifying possible actions based on the plurality of data, calculating a value of the quality information for each of the possible actions, and selecting an action from the possible actions with a highest value of the quality information, the selected action being the new control response.

2. The driving assistance method as claimed in claim 1, wherein the plurality of the received data comprises a first type of data, a second type of data, and a third type of data, the data of the first type of data concerning an evolution of the vehicle, the data of the second type of data concerning an evolution of the road, the data of the third type of data concerning an evolution of an environment of the autonomous motor vehicle.

3. The driving assistance method as claimed in claim 2, wherein the data of the first type of data comprise data selected from among a list of the following data:
    data on change of weight;
    data on change of tire; and
    data on change of a status of the autonomous motor vehicle.

4. The driving assistance method as claimed in claim 2, the data of the second type of data comprise data selected from among a list of the following data:
    data on weather conditions;
    data on a type of road; and
    data on a state of the road.

5. The driving assistance method as claimed in claim 2, wherein the data of the third type of data comprise data selected from among a list of the following data:
    free driving data;
    nominal driving data; and
    emergency driving data.

6. The driving assistance method as claimed in claim 1, wherein the receiving and processing the plurality of data, the generating the control response, and the sending the command are performed according to a fuzzy logic.

7. A non-transitory computer readable medium comprising program instructions that, when they are executed or interpreted by a driving assistance device, trigger an implementation of the driving assistance method as claimed in claim 1 in the autonomous motor vehicle.

8. A device for assisting in driving of an autonomous motor vehicle on a road, said device comprising:
    a fuzzy system comprising:
        a fuzzying block configured to receive and process a plurality of data in order to determine a current situation of the autonomous motor vehicle;
        an inference engine configured to interrogate a database in order to obtain a control response to be made with respect to said current situation; and
        a defuzzying block configured to command an actuator in order to control the autonomous motor vehicle, according to the control response to be made; and
    a reinforcement learning agent, said agent being configured to receive the command sent to the actuator and to generate a new optimized response with respect to the current situation according to an item of quality information on a result of the command for the control of said autonomous motor vehicle,
    wherein the reinforcement learning agent is configured to receive the plurality of data, identify possible actions based on the plurality of data, calculate a value of the quality information for each of the possible actions, and select an action from the possible actions with a highest value of the quality information, the selected action being the new optimized response.

9. The autonomous motor vehicle comprising:
    the driving assistance device as claimed in claim 8.

10. The driving assistance method as claimed in claim 1, wherein the actuator is a steering column of the autonomous motor vehicle.

11. The driving assistance method as claimed in claim 1, wherein the value of the quality information Q is determined according to the following equation:

$$Q(s_t, a_t) = Q(s_t, a_t) + \alpha(r_t + \beta_{a_{t+1}} \max(Q(s_{t+1}, a_{t+1})) - Q(s_t, a_t))$$

$s_t$ being a state of the data at a moment t,
$a_t$ being the action undertaken at the moment t,
$r_t$ being a reward at the moment t,
$\alpha$ being a learning rate, and
$\beta$ being an updating factor.

12. The driving assistance device as claimed in claim 8, wherein the value of the quality information Q is determined according to the following equation:

$$Q(s_t, a_t) = Q(s_t, a_t) + \alpha(r_t + \beta_{a_{t+1}} \max(Q(s_{t+1}, a_{t+1})) - Q(s_t, a_t))$$

$s_t$ being a state of the data at a moment t,
$a_t$ being the action undertaken at the moment t,
$r_t$ being a reward at the moment t,
$\alpha$ being a learning rate, and
$\beta$ being an updating factor.

* * * * *